Dec. 11, 1956　　M. L. NIELSEN ET AL　　2,773,737
CHEMICAL PROCESS FOR RECOVERING NIOBIUM VALUES
FROM NIOBIFEROUS FERROPHOSPHORUS
Filed Nov 24, 1953
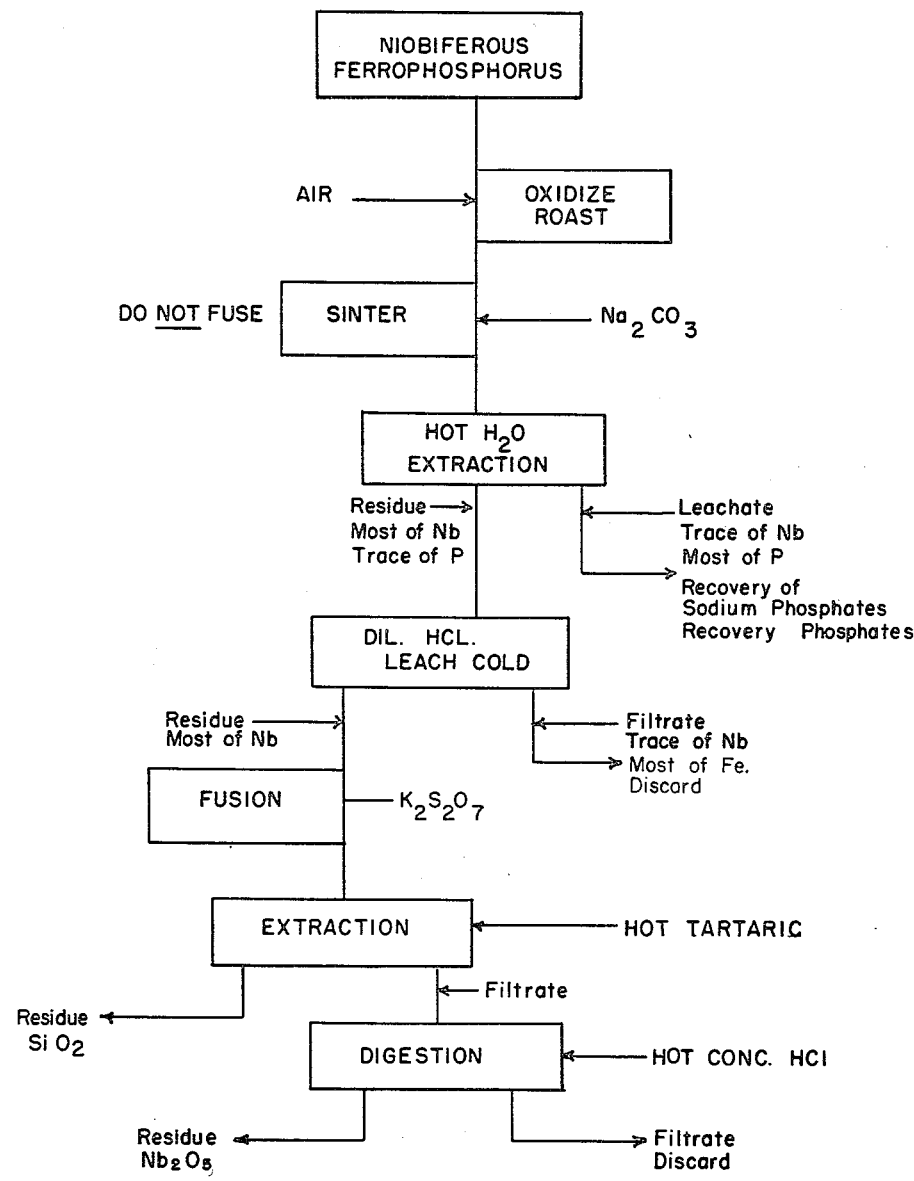
*INVENTORS*
M.L. Nielsen
L.K. Duncan
BY 2,773,737
Patented Dec. 11, 1956

2,773,737

CHEMICAL PROCESS FOR RECOVERING NIOBIUM VALUES FROM NIOBIFEROUS FERROPHOSPHORUS

Morris L. Nielsen, Centerville, and Larry K. Duncan, Dayton, Ohio, assignors to Monsanto Chemical Company, St. Louis, Mo., a corporation of Delaware Application November 24, 1953, Serial No. 394,134

3 Claims. (Cl. 23—16)

This invention relates to the recovery of niobium values from phosphatic ores or alloys containing the same.

The element niobium, also commonly referred to as columbium, has been found to be important as a constituent of stainless steels, wherein it serves to overcome a tendency towards inter-granular corrosion.

Suitable ores of niobium are relatively scarce and the methods of separation hitherto proposed have been expensive and inefficient, with the result that the unit cost of useful concentrates containing this element has been high.

It is an object of this invention to provide an improved process for recovery of niobium values from phosphatic ores. Phosphatic ores containing niobium are found in Africa and in other places.

When phosphatic ores are smelted by the electrothermal process, most of the phosphorus is liberated as gaseous elemental phosphorus and collected as yellow or white phosphorus, while a small but significant amount of the phosphorus combines with the iron normally present in the ore to form ferrophosphorus.

Practically all of the iron present in the ore is recovered as ferrophophorus, the phosphorus content of which varies from 20% to 25% by weight. When niobium is also present in the ore this element is concentrated in the ferrophosphorus. As a result of such occurrence, the ferrophosphorus will contain from 1 to 3 or more per cent of the element niobium. It is with this product that our process is chiefly concerned.

We have discovered that if ferrophosphorus containing niobium is subjected to an oxidizing roast in the presence of air, then sintered with soda ash while avoiding fusion thereof, a separation of the phosphorus in the form of phosphate from the niobium may be made by simply leaching the sinter with hot water and filtering. The filtrate will contain practically all of the phosphorus as soluble sodium phosphates, while the insoluble residue obtained will contain most of the niobium, practically all of the iron and only a trace of phosphorus compounds.

The sodium phosphate may be recovered by crystallization from the filtrate and used for various purposes.

The residue obtained above is treated with cold dilute HCl and filtered, the filtrate resulting therefrom containing most of the iron with only a trace of niobium. The residue is fused with potassium or sodium pyrosulfate, whereby the niobium is rendered soluble in hot tartaric acid and may be separated by filtration from any silica present. Solution in the hot tartaric acid results in complex formation. The soluble complex present in the filtrate is destroyed by treatment with hot hydrochloric acid whereby an insoluble hydrous niobium oxide is precipitated. The precipitate is removed by filtration, ignited to the niobium pentoxide and forms the final product of the process. It may be added that it is not unusual to find a few per cent of tantalum present in the niobium oxide.

Reference is made to the accompanying drawing, the single figure of which illustrates a flow sheet of the process.

Ferrophosphorus containing, for example, 2% of niobium is first roasted in air to oxidize the phosphorus and iron. It appears that the oxidizing roast converts these elements finally to the iron phosphates, of which ferrous phosphate seems to be present in major proportion.

The oxidized ferrophosphorus is now sintered with a quantity of soda ash sufficient to combine with the phosphate present to form soluble sodium phosphates. The amount of soda ash employed will be from 1½ to 2 parts of $Na_2CO_3$ per part of oxidized ferrophosphorus.

The conditions under which sintering takes place are critical, because we have found that if the temperature to which the soda ash-roasted ferrophosphorus mixture is heated is so high as to cause fusion of the mass, the niobium is rendered water-soluble and the advantages of the present invention are lost. In this connection, by fusion we mean the formation of a homogeneous fluid melt as a result of the application of heat. On the other hand, if the mass is heated to a temperature below that at which fusion takes place, a sintering together of the reactants occurs without the formation of a fluid melt, with the result that the sintered product when cooled is a friable porous solid, and the niobium contained therein is water-insoluble.

The temperature at which fusion takes place and which temperature is therefore representative of the upper limit to which heating during the sintering process can be carried, is a somewhat variable one. It is dependent upon the degree to which oxidation of the ferrophosphorus has been carried and upon the amount of soda ash present in the mixture to be heated. It is, however, a simple matter, in view of the present disclosure, to control the temperature of heating so as to achieve the desired results.

As a result of sintering of the reaction mass, the phosphorus is present in water-soluble form, the iron is present as an oxide of iron, and the niobium is present as an oxide or phosphate and is insoluble in water.

With the sintered mass in this condition, extraction of the mass with hot water removes the phosphate, probably as a sodium phosphate, leaving the iron and niobium as an insoluble residue. Simple leaching with dilute HCl removes the iron, while the niobium remains in the insoluble residue. The subsequent treatment of the niobium residue is adopted from standard analytical procedure; for example, that described by Scott in Standard Methods of Chemical Analysis, 1, 5th edition (1939) 331–48, may be employed.

According to this method a fusion of the residue in potassium pyrosulfate is made and the fused mass, after cooling, is extracted with hot tartaric acid. Silica is removed by filtration and the tartaric acid complex destroyed by digestion with hot concentrated HCl. The niobium is precipitated as a hydrous oxide, separated by filtration, and ignited to the pentoxide.

As produced in this way the niobium pentoxide may have associated therewith some tantalum pentoxide depending upon the composition of the original ore. The present process will recover upwards of 70% of the niobium present in the starting material.

Example

A 10 g. sample of niobiferous ferrophosphorus containing 2% of Nb was subjected to an oxidizing roast at 800° C. which increased its weight 13.5%. The product so obtained was mixed with 1½ parts by weight of soda ash per part of roasted ferrophosphorus and the mixture then heated at 850° C. for 30 minutes, under which conditions sintering occurred. The cooled sinter was crushed, leached in hot $H_2O$. The leachate contained most of the phosphorus, but only a trace of Nb, the residue containing most of the Nb with only a trace of P. The leachate may be further treated for the recovery of any phosphates present therein. The residue containing most (upwards of 90%) of the Nb was leached with dilute HCl, whereby most of the iron oxide was dissolved and removed, the residue again containing the insoluble Nb probably as phosphate or oxide or mixtures thereof.

The residue at this point, weighing 0.7 g., was mixed with 1.4 g. of $K_2S_2O_7$, fused to a clear melt and dissolved in 30–40 ml. of hot tartaric acid solution. Any silica present was removed by filtration, the filtrate now containing the niobium-tartaric complex, which was then digested with 30–40 ml. of hot concentrated HCl in order to destroy the complex. The niobium was precipitated as a hydrous oxide, collected on a filter and ignited to the pentoxide.

Recovery was 80.5% of the niobium present in the ferrophosphorus as niobium pentoxide which was 95% pure.

What we claim is:

1. A process for treating niobiferous ferrophosphorus and recovery of niobium values therefrom, which comprises roasting said ferrophosphorus in air, mixing the roasted product with soda ash, heating the mixture to a temperature only sufficient to sinter the mixture, leaching the sinter with hot water, further leaching the residue with hydrochloric acid to remove iron therefrom, fusing the residue with sodium pyrosulfate, extracting the fused product with hot tartaric acid, treating the resulting niobium-tartrate complex with hot concentrated hydrochloric acid and recovering niobium values therefrom.

2. A process for treating niobiferous ferrophosphorus for recovery of niobium values therefrom, which comprises roasting said ferrophosphorus in air, mixing the roasted product with soda ash, heating the mixture to a temperature only sufficient to sinter the mixture, leaching the sinter with hot water to dissolve and remove sodium phosphate from an insoluble iron oxide-containing residue, treating said insoluble residue with hydrochloric acid to separate iron oxide in said residue, fusing the residue with sodium pyrosulfate, extracting the fused product with hot tartaric acid, treating the resulting niobium-tartrate complex with hot concentrated hydrochloric acid and recovering niobium values therefrom.

3. The process defined in claim 1, in which the roasted ferrophosphorus is mixed with about 1½ to 2 times its weight of soda ash and the resulting mixture then sintered.

References Cited in the file of this patent

UNITED STATES PATENTS

| 2,259,396 | Schlect et al. | Oct. 14, 1941 |
| 2,654,655 | Banning et al. | Oct. 6, 1953 |

OTHER REFERENCES

Williams: "Estimation of Tantalum and Niobium as Combined Oxides," Chemical Engineering and Mining Review, vol. XXXII, April 10, 1940, page 271.

Mellor: "Comprehensive Treatise on Inorganic and Theoretical Chemistry," published by Longmans, Green and Co., New York and London, 1929, vol. IX, pages 841 and 842.